United States Patent [19]
Swanger

[11] Patent Number: 5,923,699
[45] Date of Patent: *Jul. 13, 1999

[54] INDUCTION FURNANCE HEATING MODULE AND GAS ZONE

[75] Inventor: W. Shane Swanger, Pleasant Grove, Utah

[73] Assignee: Geneva Steel, Provo, Utah

[21] Appl. No.: 08/954,882

[22] Filed: Oct. 14, 1997

Related U.S. Application Data

[60] Provisional application No. 60/028,544, Oct. 15, 1996.

[51] Int. Cl.$^6$ ........................................................ F27D 7/06
[52] U.S. Cl. ........................ 373/140; 373/139; 373/141; 29/527; 219/651
[58] Field of Search ..................................... 373/138, 139, 373/140, 141, 142, 143; 29/527; 219/635, 651

[56] References Cited

U.S. PATENT DOCUMENTS

| | | | |
|---|---|---|---|
| 4,343,168 | 8/1982 | Laws et al. | 72/10 |
| 4,343,209 | 8/1982 | Moelbert | 83/16 |
| 4,452,587 | 6/1984 | Laws et al. | 432/245 |
| 4,583,387 | 4/1986 | Thomas et al. | 72/201 |
| 4,942,656 | 7/1990 | Benedetti et al. | 29/527.6 |
| 5,075,953 | 12/1991 | Braud | 29/527.7 |
| 5,101,652 | 4/1992 | Burk et al. | 72/200 |
| 5,133,205 | 7/1992 | Rostik et al. | 72/200 |
| 5,307,864 | 5/1994 | Arvedi et al. | 164/476 |
| 5,461,770 | 10/1995 | Kimura et al. | 29/727.7 |
| 5,611,232 | 3/1997 | Rohde et al. | 72/202 |

*Primary Examiner*—Teresa Walberg
*Assistant Examiner*—Quang Van
*Attorney, Agent, or Firm*—Madson & Metcalf

[57] ABSTRACT

A heating module for use in steel processing is provided. The module includes one or more gas heating zones and one or more induction heating coils intermixed among the gas heating zones. The modules are used to heat steel slabs to a consistent temperature throughout. Generally, the induction coils are used to increase the temperature of the slab, while the gas heating zones function to hold the slab at the increases temperature and to allow the heat to soak into the interior of the slab. The gas heating zones are generally lined with refractory material and include sufficient rollers to carry the steel slabs through the heating modules. The rollers are positioned in such a manner that the majority of the surface area of the roller is not within the interior of the gas heating zone at any one time. At least a segment of the floor of the gas heating zone is pivotable such that debris can be easily removed from the heating zone and such that the interior of the heating zone is easily accessed.

26 Claims, 6 Drawing Sheets

INDUCTION FURNANCE HEATING MODULE AND GAS ZONE

RELATED APPLICATIONS

This application is related to and claims priority from U.S. Provisional Patent Application No. 60/028,544 filed Oct. 15, 1996 and entitled "Blast Furnace Heating Module and Gas Zone," which provisional patent application is incorporated herein by this reference.

BACKGROUND

1. The Field of the Invention

The present invention is related to modular heating apparatus and methods for bringing steel to a consistent temperature, particularly for use in connection with steel rolling processes. More particularly, the present invention is related to heating modules which combine induction heating coils and gas holding zones in order to bring steel being processed to consistent temperatures in the core of the steel and on the surface of the steel.

2. Technical Background

There are numerous methods of processing and casting steel. Traditionally, steel was cast into ingots which were later molded or processing into the desired shape or product. The process of casting ingots is now frequently replaced by a process know as continuous casting. In continuous casting processes molten steel is cast directly into a sheet, slab, or other shape. Using continuous casting it is possible to directly form a slab of steel of the desired shape and size without first preparing an ingot. Continuous casting, therefore, is often more simple and economical than the conventional ingot processes.

In conventional continuous casting processes a slab of steel from about 150 mm to 300 mm thick and about 3,000 mm wide is formed. These slabs are then cut into pieces of varying lengths for further processing. Once the slabs are cut into pieces of the desired length they are usually heated and then rolled further in order to produce the desired final product. To produce a flat rolled steel strip, the slabs are generally reheated and then passed through one or more hot rolling roughing millstands. The slabs are then passed through one or more hot rolling millstands in order to further shape the slab. If desired, the product is then passed through reducing and finishing cold rolling millstands to produce a final product.

During the rolling process, heating the slabs to the desired temperature is a difficult and often tedious operation. As the steel slab exits the continuous caster, it is cooled sufficiently that it solidifies to the point that at the very least the exterior surface of the slab is a solid. The interior of the slab may be hotter than the exterior, and may even be close to the melting point. It is then necessary to stabilize the temperature of the slab prior to roller. The ultimate objective is to produce a slab which has a consistent, high temperature throughout, but which is still in solid form. Therefore, as the slab continues through the process in preparation for rolling, the center of the slab cools somewhat, while the exterior surface absorbs the heat applied. This temperature differential is, however, undesirable in that rolling requires a consistent temperature throughout the slab.

In order to produce a slab that has consistent temperature throughout, it is generally necessary to heat the exterior of the slab and then allow the heat to "soak" into the interior. This is usually a multiple step process. Heat is applied by one of several different methods and then allow to soak into the slab. Once this has been accomplished, heat is again applied and once again allowed to soak into the slab. After several applications of heat and several soaking periods it is the process objective that the slab will be at a consistent high temperature, but still below the melting point. Thus, rolling and finishing of the slab can occur in an effective and efficient manner.

Various methods are used during the heating and soaking process described above. One conventional method is to employ a series of induction heating coils to heat the steel slab. Induction heating coils are large coils that encompass the steel slab. An electrical current is passed through the induction coil as the slab is passed through the interior of the coil. A heat producing electrical current is induced in the steel slab. Induction heating coils are widely used and well known to those of skill in the art. As with the general process described above, the heat induced into the slab is then allow to soak into the core of the slab prior to repeating the processing using the next induction coil in the processing line.

The use of induction heating coils, while producing large increases in temperature in the steel slab, presents several problems and limitations as well. Such coils consume large quantities of expensive electrical energy. In a typical conventional induction heating line, it is not unusual to find seven (7) or more coils used to heat the slab to the desired temperature. This series of induction coils consumes large quantities of electricity which substantially increases the cost of the final steel product.

Induction coils also have the limitation of heating the exterior shell of the steel slab. Indeed, it is necessary to careful control the operation of the induction coils in order to make certain that the exterior shell of the slab is not liquified during heating. Thus, induction coils necessitate the use of substantial soaking periods during processing. During the soaking periods the overall temperature of the steel slab will drop substantially prior to application of heat by the next induction coil. Thus, the energy lost during the process is substantial, which at the same time substantially increases the cost of the process.

An alternative heating means is a gas fired furnace or gas heating zone. Gas fired furnaces of this type are also well known in the art. It is possible to roll the steel slabs through a gas fired furnace in order to increase the temperature of the slab. Gas fired furnaces have the advantage of operating on a relatively inexpensive fuel, namely natural gas. Gas fired furnaces have a number of limitations as well. For example, gas fired furnaces provide a more gradual heating of the slab in that they are unable to administer the high levels of energy provided by induction. Thus, gas heating zones must usually be of substantial length in order to achieve the necessary heating.

Because of the length of the typical gas heating zone, it is necessary to provide rollers within the heating zone to support and transport the steel slab. It will be appreciated that temperatures in the 2300° F. range are often reached in the gas heating zone. Thus, it is necessary to employ rollers that can operate undamaged at these high temperatures. In order to survive temperatures in excess of 2300° F. it is generally necessary to use extremely expensive cobalt rollers. These are to be contrasted with less expensive nickel alloy rollers that can be used if temperatures in the 2200° F. ranges are encountered. The difference in cost between the nickel alloy and cobalt rollers is enormous. It will further be appreciated that if it were possible to reduce operating temperatures for the rollers to significantly below the 2200°

F., it would be possible to use even less expensive rollers in the gas heating zone. However, this is difficult to achieve in view of the necessity of heating the steel slabs to consistent high temperatures in preparation for rolling and finishing.

A further problem encountered with conventional gas heating zones is maintenance and cleaning. Generally it is necessary to shut down the gas heating zone and allow it to cool to sufficiently that maintenance personnel and enter the gas zones and clean accumulated waste materials. Scale and other debris gradually accumulate in the gas zones and require removal at periodic intervals. Shutting down the gas heating zones generally requires shutting down the entire steel production line. This is extremely expensive and wasteful, particularly in view of the economics of steel production.

Therefore, what is needed in the art are improved methods and apparatus for heating steel slabs to a consistent temperature following casting and before rolling. In that regard, it would be a significant advancement in the art to provide such methods and apparatus which took advantage of the benefits of both gas heating and heating using induction coils. It would be a significant advantage to provide induction heating while significantly reducing the number of induction coils and the corresponding use of electrical energy.

It would also be a significant advancement in the art to provide such methods and apparatus that included gas heating zones, but which overcame some of the significant limitations encountered in the use of conventional gas heating zones. In particular, it would be a significant advancement in the art to provide gas heating zones which were easily cleaned and maintained without the necessity of entirely closing the steel processing line. It would also be a significant advancement in the art to provide gas heating zone which were able to heat steel to high temperatures, even to temperatures in excess of 2300° F., without the necessity of using extemely expensive rollers such as cobalt rollers.

Such methods and apparatus are disclosed and claimed herein.

BRIEF SUMMARY AND OBJECTS OF THE INVENTION

The present invention is related to modular heating apparatus and methods for bringing steel to a consistent temperature, particularly for use in connection with steel rolling processes. The present invention relates to a unique modular combination of induction heating coils and gas holding zones. The present invention employs these mechanisms in order to bring steel slabs to consistent temperatures in the core and on the surface. The heating modules of the present invention overcome several of the problems encountered in conventional steel slab heating methods.

The heating system of the present invention includes at least two gas heating zones and at least one induction heating coil positioned between the gas heating zones such that at least one induction heating coil is placed between each adjacent pair of gas heating zones. The heating system is configured such that steel slabs can pass through the interior of the gas heating zones and the induction heating coils. During this process the steel is supported by a plurality of rollers positioned within the gas heating zones. The rollers are placed and configured such that steel slabs can freely roll through the interior of the gas heating zones and the induction heating coils.

The gas heating zone includes a floor, ceiling, and opposing walls. The interior of the gas heating zone is generally lined with refractory material in the manner well known and accepted in the art. In one embodiment of the present invention, however, each gas heating zone includes a floor configured such that at least one segment of said floor is pivotably mounted. Thus, the pivotably mounted segment of the floor can be pivoted to facilitate the removal of scale and other debris. Each of the gas modules includes at least one gas burner so that the interior of the gas heating module can be maintained at the desired temperature during processing of the steel slab.

One of the significant improvements taught by the present invention is the placement of the rollers within the gas heating zone. In one preferred embodiment, the rollers are positioned with respect to said floor in such a manner that less than half of the roller is exposed to the interior of the gas heating zone at any one time. Because only a portion of the roller is exposed to the interior of the gas heating zone at any one time it is possible to use rollers which are temperature rated to a lower temperature than the actual ambient temperature of the interior of the gas heating zone. Even when operating the gas heating zone at temperatures in excess of 2300° F., it is possible to employ rollers which are temperature rated to approximately 2200° F. or less. In many applications it is possible to use rollers which are temperature rated to approximately 2100° F. or less. This feature provides a very large savings in the capital cost of the heating modules of the present invention.

Another important feature of the present invention is the ability to employ high power induction coils. Because of the fact that the steel stabs pass through a gas heating zone where heat soaking occurs, it is possible to further concentrate the temperature raising effect of the induction coils. Thus, a few very high powered induction coils are used, as opposed to many induction coils operating at lower power.

In operation, the present invention provides a method of processing steel slabs such that they have generally consistent temperatures on their surface and within their cores such that they are suitable for rolling. The steps of the process include passing steel slabs through a plurality of gas heating zones and a plurality of induction heating coils positioned between said gas heating zones. In this manner it is possible for the induction coils to substantially increase the temperature of the slab. The slab is then passed into the gas heating zone where the heat is allowed to "soak" into the core of the slab. Unlike many conventional processes, however, the use of the gas heating zone allows the slab to be maintained at a consistent high temperature rather than losing heat between induction coils. In this manner, the overall temperature of the steel slab is stepped up until a high consistent temperature is reached. At this point, the slab is ready for rolling and further precessing.

These and other objects and advantages of the invention will become apparent upon reading the following detailed description and appended claims, and upon reference to the accompanying drawings.

BRIEF DESCRIPTION OF THE DRAWINGS

In order to more fully understand the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
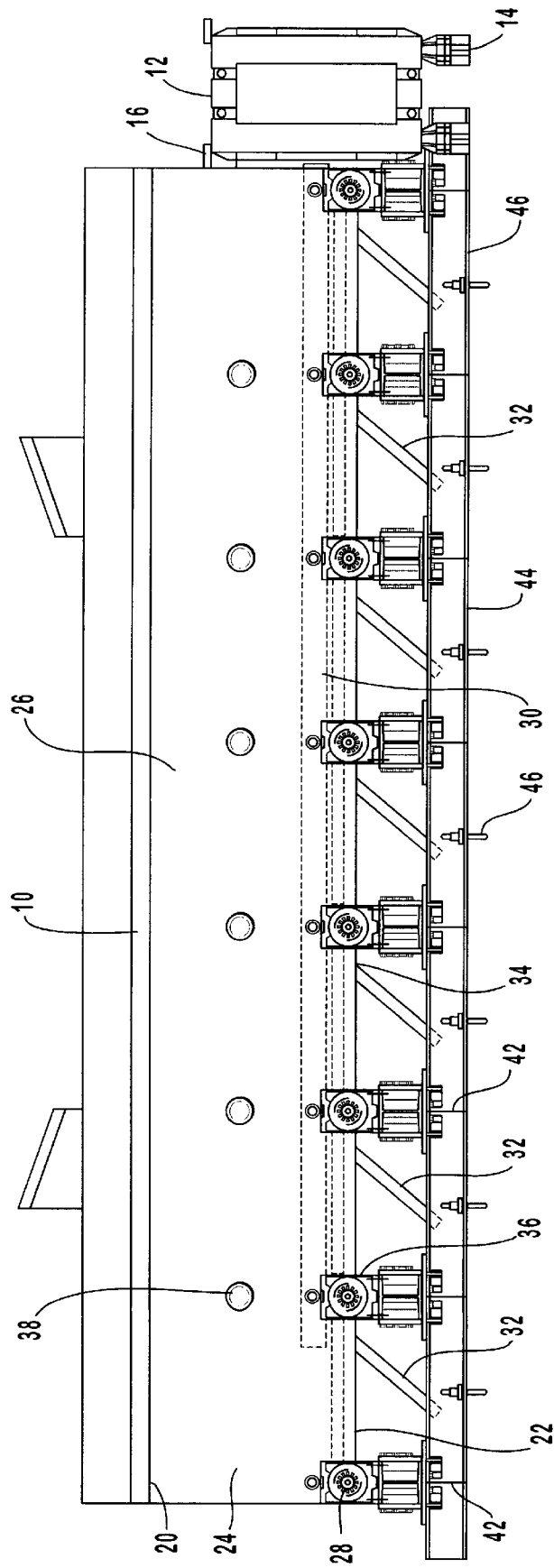
FIG. 1 is a longitudinal cross sectional view of one embodiment of the heating module of the present invention illustrating one gas heating zone and one induction heating coil.

The present invention can be best understood by reference to the drawings where like parts are designated with like numerals throughout. FIG. 1 illustrates a gas heating zone 10 and an induction heating 12 placed together in a modular form. As was discussed above, the present invention relates to improved apparatus and methods for heating steel slabs prior to rolling. The present invention is able to take advantage of the benefits of both gas heating and induction heating, while at the same time overcoming several of the disadvantages encountered in conventional processing mechanisms.

The induction heating coil 12 is a conventional induction coil of the type widely used in the steel making industry. The coil 12 is configured such that a steel slab of the desired size can pass through the interior of the coil. As the slab is passing through the interior of the coil, an electrical current is passed through the coil from a conventional current source (not shown). The resulting induction within the slab causes the slab to be very rapidly heated, particularly on the outer surface of the slab and in the portions of the slab near the surface. In this manner a very rapid and substantial increase in the temperature of the slab can be achieved.

The induction coil 12 is mounted using conventional mounting brackets 14. The induction coil 12 is also securely attached to the gas heating zone by a housing member 16 in such a manner that heat loss at the connection between the induction coil 12 and gas heating zone 10 is minimized. At the same time, the steel slab being processed is contained in a continuous housing during processing through the apparatus of the present invention.

The gas heating zone 10 is also entirely enclosed, with the exception of a conventional vents or flues 18. The gas heating zone includes a ceiling 20, a floor 22, and a pair of opposing side walls 24, one of which is shown in the cross sectional view of FIG. 1. The entire gas heating zone may be line with refractory material 26, such as brick conventionally used in furnaces of this type. The refractory brick serves to insulate the interior of the gas heating zone from the outside environment. The refractory brick is also a good heat reflector, directing heat produced within the gas heating zone back onto the steel slab being processed.

As illustrated in FIG. 1, the gas heating zone 10 also includes a plurality of rollers 28. The rollers 28 may be mounted by a conventional roller mounting mechanism described further below with reference to FIG. 2. One of the improvements provided by the present invention is the location and placement of the rollers 28 with respect to the floor 22. In conventional gas heating zones, the rollers are often placed well above the floor in that the entire roller mounting mechanism is housed within the gas heating zone. In the present invention. the floor is raised with respect to the rollers 28. In this manner, only a relatively small portion of the roller is exposed to the extreme heat encountered within the interior of the gas heating zone. Indeed, less than half of the roller surface is exposed to the gas heating zone at any one time. Thus, the effective temperature encountered by the rollers as they rotate is substantially below the actual temperature within the interior of the gas heating zone 10.

The rollers, while mounted in such a manner that only a portion of each roller is exposed to the interior of the gas heating zone, are still able to perform their function with ease. As illustrated in FIG. 1, a steel slab 30 is well supported by the plurality of rollers. The slab is able to pass unobstructed through the gas heating zone 10 and into the induction coil 12. An additional advantage to the positioning of the rollers 28 near the level of the floor 22, is that additional heat is radiated from the floor 22 onto the bottom surface of the steel slab 30. This effective is increased by the fact that the steel slab passes through the gas heating zone 10 very near the floor 22. This heat radiation further facilitates the even heating of the steel slab 30.

A further inventive feature of the present invention are methods of mounting the floor segments within the gas heating zone 10. In particular, at least selected segments 32 of the floor 22 are pivotably mounted. Any type of acceptable hinging mechanism 34 may be employed such that the floor segments 32 may pivot, opening the floor of the gas heating zone 10. In addition, any type of acceptable latching mechanism 36 may be employed to hold the floor segments 32 in place during operation. In one embodiment, the pivotably floor segments 32 are constructed of angle iron overlaid with refractory brick. Other configurations of the floor segments 32 also fall within the scope of the present invention.

In use, when it is desired to clean the gas heating zone 10, or perform other types of maintenance duties, it is a simple procedure to unlatch the latching mechanism 36 and tilt the floor segment 32 downwardly. In this position, scale and other debris can be removed from the gas heating zone without the necessity of shutting down the entire processing line.

Thus, the floor configuration of the present invention provides multiple benefits. The floor and the rollers are configured such that the steel being processed is very near the floor as it passes through the gas heating zone 10, thereby maximizing heating. The floor is also flexible in that segments of the floor pivot in order to provide convenient access to the interior of the gas zone 10.

FIG. 1 also illustrates a plurality of gas burners 38 placed within the gas heating zone 10. Gas burners 38 burn the natural gas which heats the interior of the gas heating zone. Gas burners of various conventional configurations may be used. Burners of this type of widely used in the steel-making industry. In addition, the gas burners 38 may be positioned at various locations within the interior of the gas heating zone to provide the necessary heating for the steel slab 30. Burning of natural gas in the manner illustrated has the potential for producing temperatures in excess of 2300° F. The actual operating temperature can be controlled as desired.

FIG. 1 also illustrates one embodiment of means for mounting the heating system to the floor of the steel plant. A series of support brackets 42 are provided beneath each roller and support the gas heating zone 10. The support brackets 42 are in turn connected to a support plate 44. The support plate 44 may then be securely attached to the floor of the steel plant, as with the use of bolts 46 as illustrated in FIG. 1. The method of attachment and support of the device is not critical and any suitable conventional method may be used.

Figure 2:
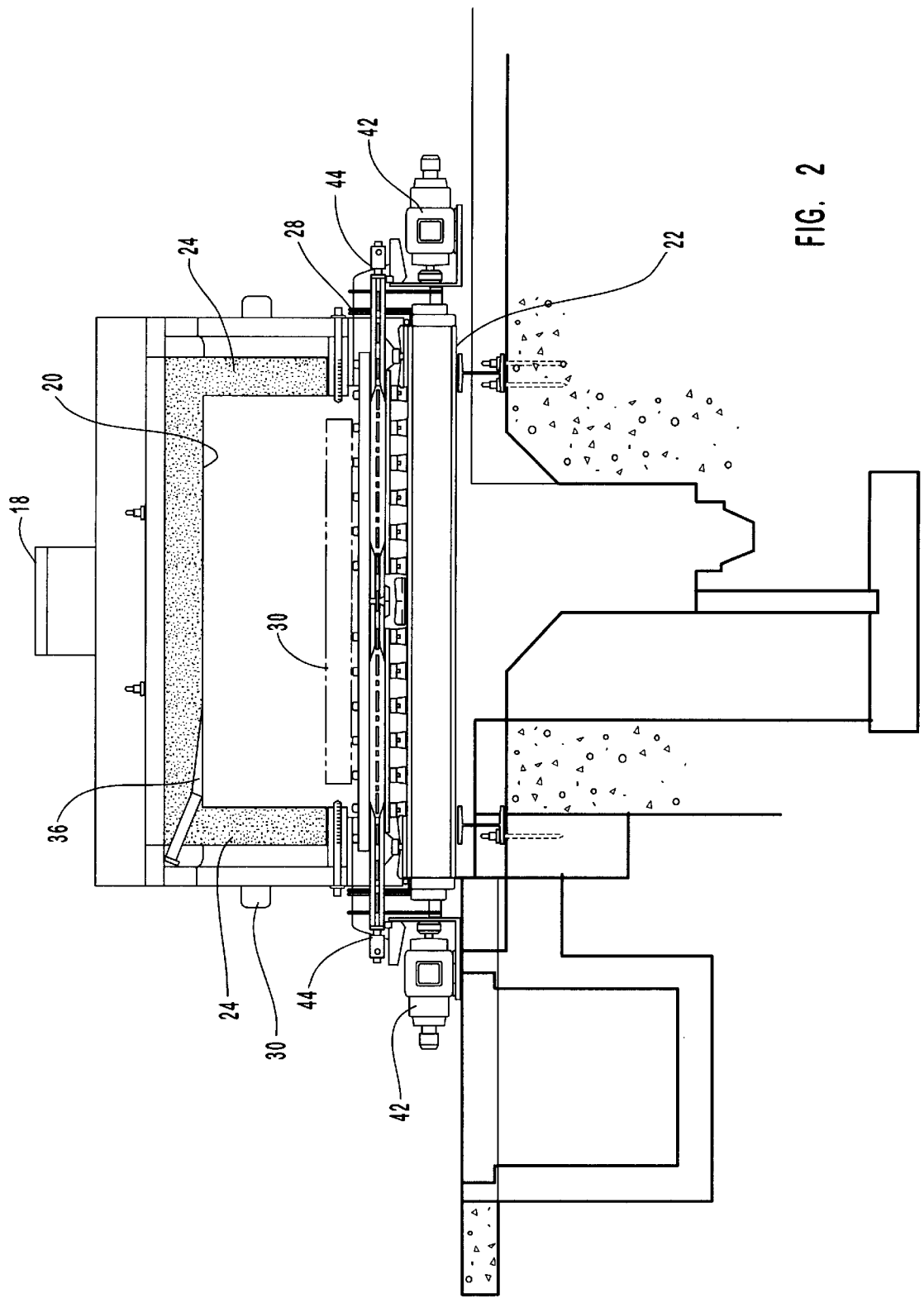
FIG. 2 is a transverse cross sectional view of the gas heating zone illustrated in FIG. 1.

FIG. 2 is a transverse cross sectional view of the gas heating zone described with reference to FIG. 1. As described above, the gas heating zone is comprised of a floor 22, a ceiling 20, and two side walls 24. The interior of the gas heating zone is lined with refractory brick 36. As mentioned above, this material is preferred because of its ability to thermally insulate the interior of the gas heating zone 10, and further its ability to radiate heat back into the interior to heat the steel slab 30. Thus, a substantially enclosed gas heating zone is provided. The sole outlet from the heating zone 10 is likely to be a vent or flue 18 which is design in order to release the combustion gases.

As mentioned in the discussion above, the rollers 28 are also illustrated. The rollers 28 are positioned such that they protrude above the floor only a sufficient distance to easily carry the steel slab 30. As mentioned above, this significantly reduces the effective temperature to which the roller is exposed. When the temperature of the interior of the gas heating zone is in the range of 2300° F. or above, the effective temperature of the roller is significantly lower because only a relatively small percentage of the surface area of the roller is exposed to the high temperatures at any one time. Thus, it is possible to use rollers that have lower temperature rating than would otherwise be possible. As described above, this significantly lowers the overall cost of the gas heating zone.

Also illustrated in FIG. 2 are motors 48 and drive mechanisms 49. The rollers are driven by conventional methods employed in the steel industry. Thus, the rollers are powered by conventional motors or other acceptable mechanisms.

Figure 3:
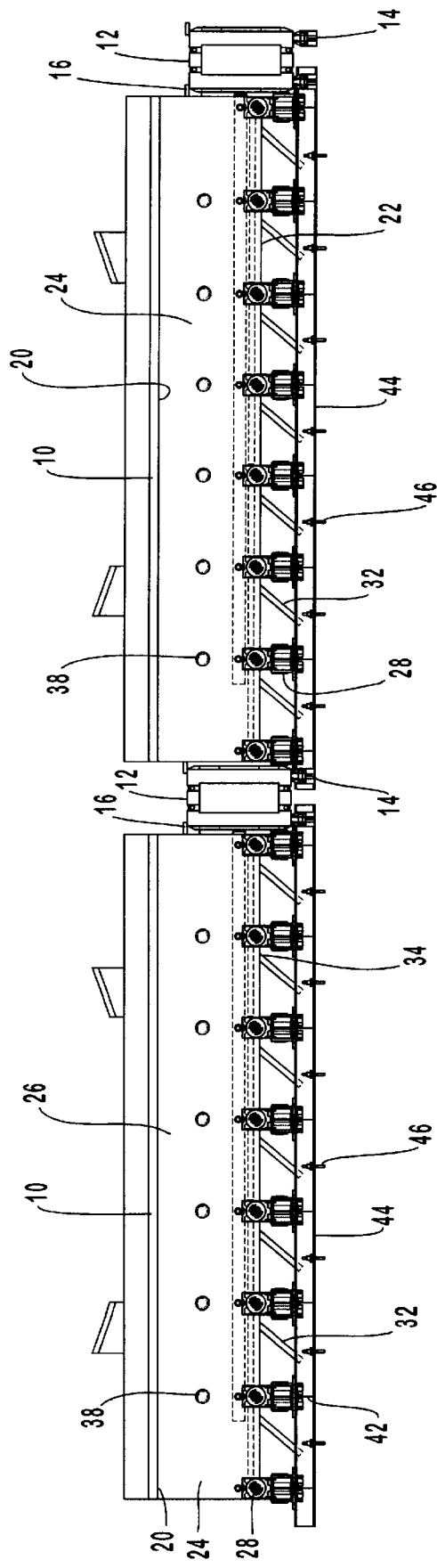
FIG. 3 is a longitudinal cross sectional view of a segment of a steel processing line employing the present invention including two gas heating zones and two induction heating coils.

Referring now to FIG. 3 the heating module of the present invention is illustrated in place in a steel processing line. As illustrated in FIG. 3, a plurality of gas heating zones 10 and induction coils 12 can be used to heat to the steel slab to the desired temperature. In a preferred embodiment, a least one induction coils 12 is placed between each pair of gas heating zones 10. In that manner the temperature of the steel can be raised by the induction coil, and the heat can be allowed to soak into the steel as it passes through the gas heating zone 10. The gas heating zone 10, maintains the steel at the temperature produced by the preceding induction coil 12.

One advantage of the present invention is that it is entirely modular. Gas heating zones 10 and induction coils 12 can be placed at any desired location in the processing line. A series of induction coils 12 can be placed between each pair of gas heating zones if this is desirable in the specific line in question. At the same time, the gas heating zones 10 can be expanded. It is possible to string together several gas heating zones if desired for the specific application.

As illustrated in FIG. 3, it will be appreciated that the gas heating zones 10 and induction coils 12 are easily and effectively coupled to one another by means of housing members 16. Thus, assembly is relatively simple and inexpensive. At the same time, the various modules are easily mounted using the means described above. It is also relatively easy to move or reconfigure the system as needed.

Figure 4:
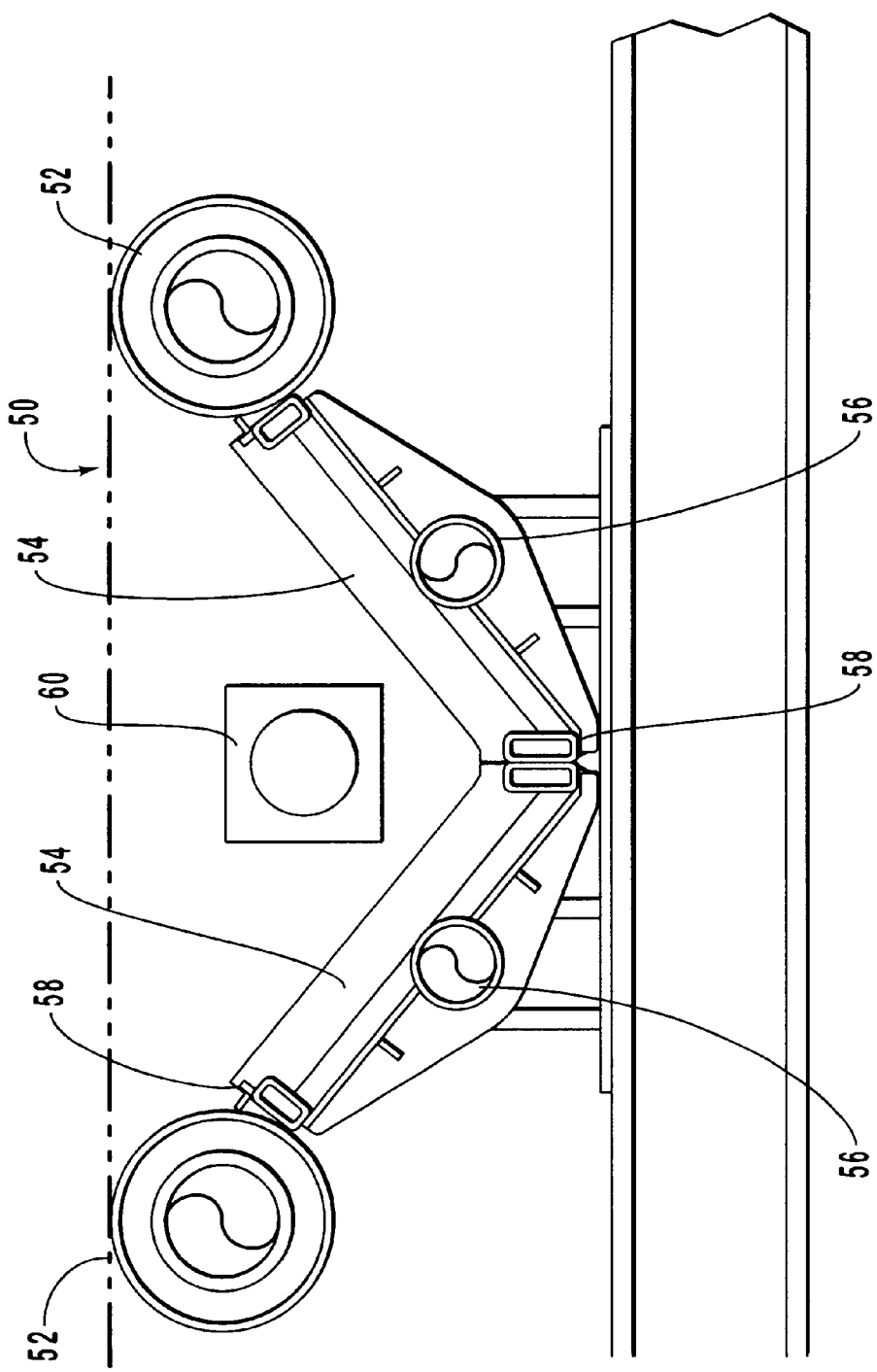
FIG. 4 is a transverse cross sectional view of an alternative embodiment of the gas heating zone of the present invention.

FIG. 4 illustrates an alternative embodiment of the floor and pivotable floor segments of the present invention. FIG. 4 is a longitudinal, cross sectional view of a pivotable floor segment 50 and a pair of rollers 52. The floor segment 50 illustrated in FIG. 4 is pivotably attached in a different manner than floor segment 32 discussed above. Floor segment 50 includes a pair of floor plates 54. The floor plates 54 pivot about centrally mounted hinges 56. The floor plates 54 may be locked in place with latches 58, or by any other acceptable mechanisms.

Using this embodiment, when it is desirable to remove debris from the interior of the gas heating zone, the latches 58 are opened, and the floor plates 54 pivoted such that the gas heating zone is opened. At this point in time, it is possible to service the interior of the gas zone.

As illustrated in FIG. 4, a gas burner 60 may be placed in the V-shaped indentation formed by the pair of floor plates 54. In this manner additional heat is generated directly below the steel slab as it passes through the gas heating zone. This provides for more even and uniform heating, which is the ultimate objective of the entire process.

Figure 5:
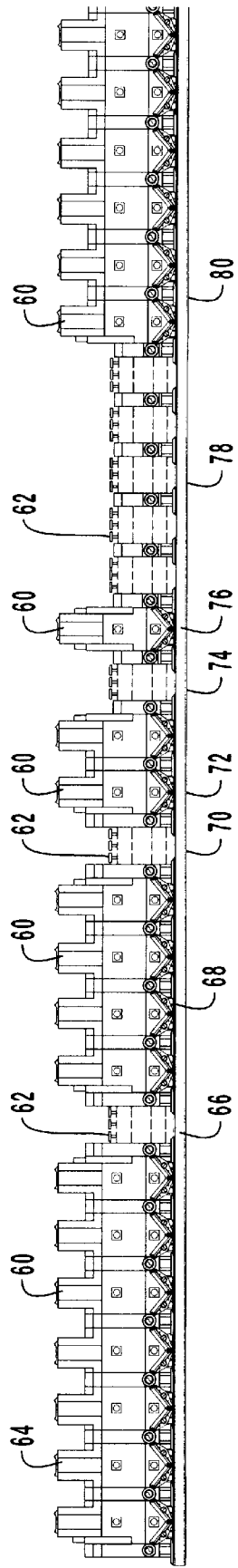
FIG. 5 is a longitudinal cross sectional view illustrating a "straight through" processing mode and further illustrating an alternative embodiment of the gas heating zone.

FIG. 5 illustrates one embodiment of a heating system employing the floor configuration illustrated in FIG. 4 and described above. In this embodiment, induction heating coils 62 are interspersed between several gas heating zones 60. This embodiment of the invention is particularly designed for passing steel stabs straight through the process line. The steel slab first moves through a series of modular gas heating zones 64 and then into induction coil 66. Induction coil 66 operates to increase the temperature of the slab. The slab is then moved into another series of modular gas heating zones 68, where the heat is allowed to soak into the interior of the slab. The slab then passes into induction coil 70 where the slab is once again heated. These steps are then repeated in gas heating zones 72, 76, and 80, and induction coils 74, and 78.

FIG. 5 illustrates the modular nature of the present invention. Multiple gas heating zones can be located adjacent one another. Likewise, multiple induction coils can be located adjacent one another. The modules can even be moved and relocated if processing conditions change.

Figure 6:
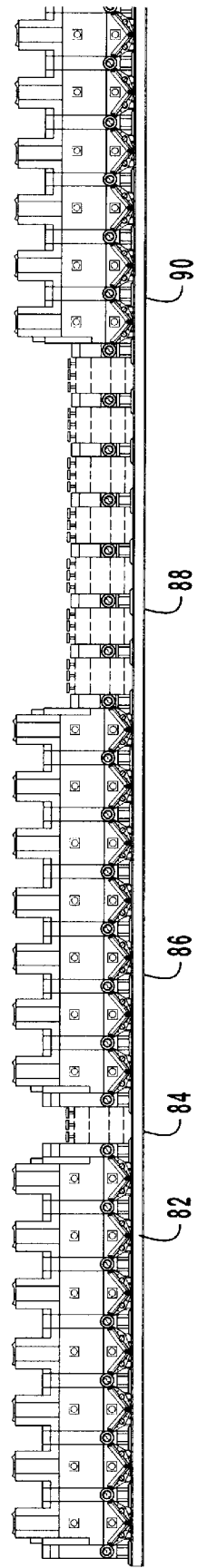
FIG. 6 is a longitudinal cross sectional view illustrating an "oscillating" processing mode and using the gas heating zone of FIG. 4.

FIG. 6 illustrates a further embodiment of a processing line. This line is particularly adaptable for applying an oscillating induction mode of heating. That is, the steel slab moves through gas heating zones 82 and 86 and induction coil 84 as previously discussed. However, the slab can be positioned entirely within the series of induction coils designed 88. While within the interior of coils 88, the slab may be caused to oscillate, or move back and forth within the interior of the series of induction coils 88, until a desired temperature is reached. At that point the slab is moved along the processing line into gas heating zone 90 and finally on to be rolled and further processed.

Figure 7:
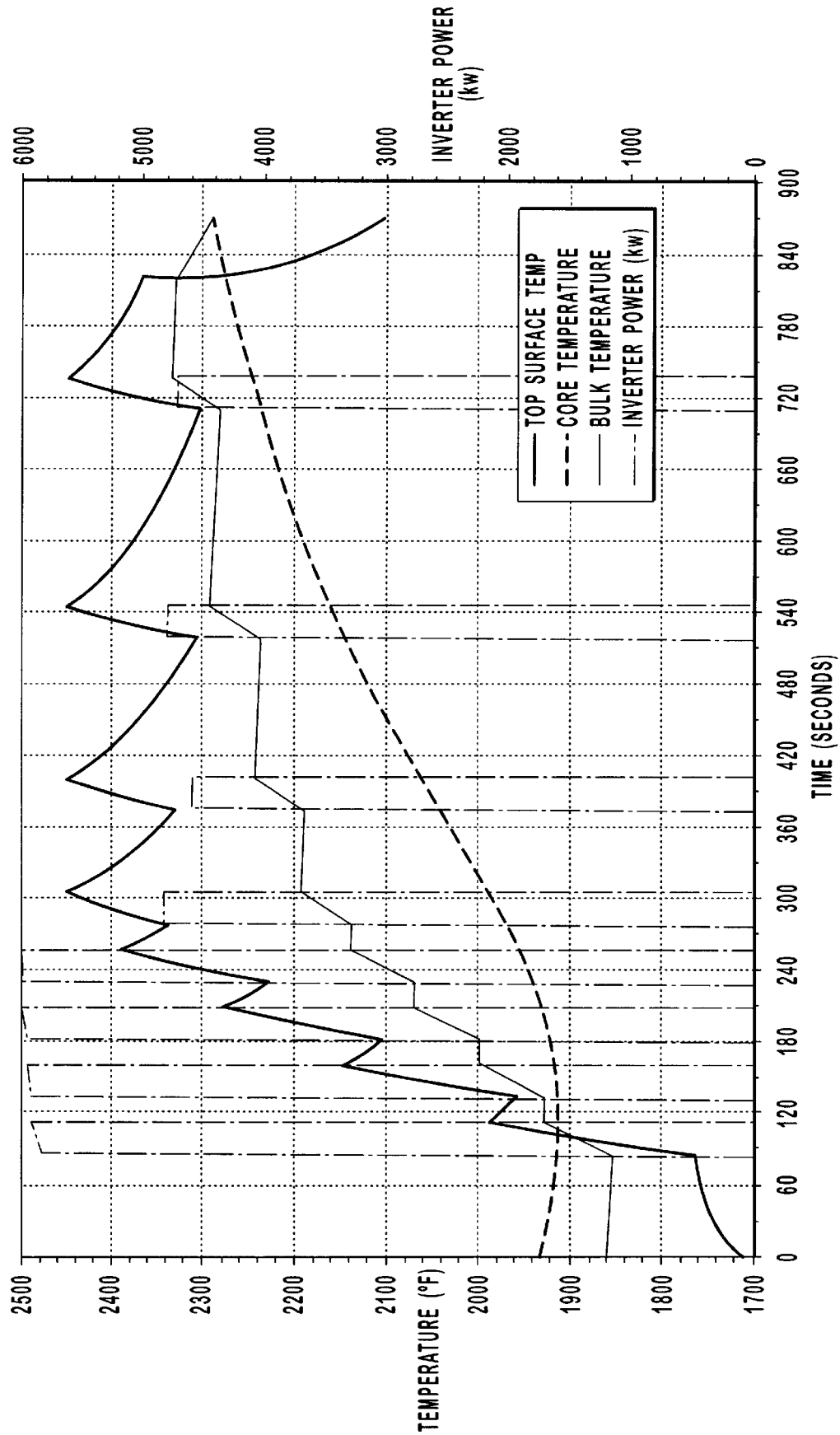
FIG. 7 is a graph which illustrates the changes in temperature of a steel slab over time, as well as the power in kW of the induction coils.

FIG. 7 graphically illustrates the effectiveness of the present invention. FIG. 7 also graphically illustrates the manner in which the surface of the steel is first heating and the heating is then allowed to soak into the core of the steel slab. As the steel slab moves into the heating system of the present invention the bulk temperature and core temperature are actually higher than the surface temperature of the steel. This is due to the solidification process at the conclusion of the continuous caster as described above. At this point, the slab moves through an induction coil and the surface temperature is raised dramatically. At this point the heat is allowed to soak into the core of the slab, before the slab moves through the interior of another induction coil and the surface temperature is substantially raised once again.

In this manner the heating process of the present invention becomes clear. Induction heating is applied in bursts, followed by a soaking period within the gas heating zones. In this manner the bulk and core temperatures raise until they substantially intersect with the plot of the surface temperature. At that point the slab is ready for rolling in that a substantially consistent temperature has been reached throughout the slab.

Thus, the present invention provides methods and apparatus for heating steel slabs to a consistent temperature following casting and before rolling. The methods and apparatus of the present invention provide the benefits of both gas heating and heating using induction coils. At the same time the number of induction coils and the corresponding use of electrical energy is significantly reduced.

The invention also includes gas heating zones, but is able to overcome some of the significant limitations encountered in the use of conventional gas heating zones. In particular, gas heating zones are provide which were easily cleaned and maintained without the necessity of entirely closing the steel processing line by use of the pivot able floor segments. The gas heating zone is also able to heat steel to high temperatures, even to temperatures in excess of 2300° F., without the necessity of using enormously expensive rollers such as cobalt rollers.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A heating system for use in preparing steel slabs for rolling comprising at least two gas heating zones, wherein each gas heating zone includes a floor and at least one induction heating coil positioned between said gas heating zones such that at least one induction heating coil is placed between each adjacent pair of gas heating zones, said heating system being configured such that steel slabs can pass through the interior of said gas heating zones and said at least one induction heating coil and further comprising a plurality of rollers positioned within said gas heating zones such that steel slabs can roll through the interior of said gas heating zones and said at least one induction heating coil, wherein said rollers are positioned with respect to the floor in such a manner that less than half of the surface of each of said rollers is exposed to the interior of the gas heating zone at any one time.

2. A heating system as defined in claim 1 wherein each floor of said gas heating zones is configured such that segments of said floor are pivotably mounted.

3. A heating system as defined in claim 1 wherein said rollers are temperature rated to approximately 2200° F. or less.

4. A heating system as defined in claim 1 wherein said rollers are temperature rated to approximately 2100° F. or less.

5. A heating system as defined in claim 1 wherein each of said gas heating zones comprises a housing having a floor, a ceiling and a pair of opposing walls, at least one wall of said housing being lined with refractory material, said floor being configured such that at least a segment of the floor is pivotable in such a manner that when the segment of the floor is pivoted, debris on said floor can be removed.

6. A heating system as defined in claim 5 wherein said floor, ceiling, and opposing walls are lined with refractory material.

7. A heating system as defined in claim 1 wherein each of said gas heating zones includes at least one gas burner.

8. A heating module for use in preparing steel slabs for rolling comprising a gas heating zone having a floor, said gas heating zone including at least one roller positioned within said gas heating zone with respect to the floor in such a manner that at least one half of the surface of the roller is not exposed to the interior of the gas heating zone at any one time, and an induction heating coil positioned generally adjacent to said gas heating zone.

9. A heating module as defined in claim 8 wherein said gas heating zone further comprises a floor being configured such that at least a segment of the floor is pivotable.

10. A heating module as defined in claim 8 wherein said at least one roller is temperature rated to approximately 2200° F. or less.

11. A heating module as defined in claim 8 wherein said at least one roller is temperature rated to approximately 2100° F. or less.

12. A heating module as defined in claim 8 wherein said gas heating zone comprises a housing having a floor, a ceiling and a pair of opposing walls, at least one wall of said housing being lined with refractory material, said floor being configured such that at least a segment of the floor is pivotable in such a manner that when the pivotable segment of the floor is pivoted debris on said floor can be removed.

13. A heating module as defined in claim 12 wherein said floor, ceiling, and opposing walls are lined with refractory material.

14. A heating module as defined in claim 8 further comprising at least one gas burner.

15. A steel slab heating module comprising:
    an induction heating coil; and
    a gas heating zone positioned generally adjacent to said induction heating coil, said heating zone comprising a housing having a floor, a ceiling and side walls, at least one wall of said housing being lined with refractory material, said floor being configured such that at least a segment of the floor is pivotable in such a manner that debris on said floor can be removed, and rollers for transporting steel slabs through said gas heating zone.

16. A steel slab heating module as defined in claim 15 wherein said rollers are positioned with respect to the floor in such a manner that less than approximately half of the surface area of the rollers is exposed to the interior of the gas heating zone at any one time.

17. A steel slab heating module as defined in claim 15 wherein said rollers are temperature rated to approximately 2200° F. or less.

18. A steel slab heating module as defined in claim 15 wherein said floor is lined with refractory materials.

19. A heating module for use in steel processing comprising:
    a first gas heating zone comprising a floor, a ceiling, a pair of side walls, at least one gas burner, and at least one roller, said roller being positioned with respect to the floor such that at least half of the roller is not exposed to the interior of the gas heating zone at any one time, said first gas heating zone being configured such that a steel slab can be rolled through said first gas heating zone;

an induction heating coil having a first side and a second side, said first side being positioned generally adjacent said first gas heating zone and being configured such that a steel slab can be rolled through said induction heating coil; and a second gas heating zone comprising a floor, a ceiling, a pair of side walls, and at least one gas burner, and at least one roller said roller being positioned with respect to the floor such that at least half of the roller is not exposed to the interior of the gas heating zone at any one time, said second gas heating zone being configured such that a steel slab can be rolled through said second gas heating zone, said second gas heating zone being positioned generally adjacent to said second side of said induction heating coil.

20. A gas heating zone comprising a floor, a ceiling, a pair of side walls, and at least one gas burner, and at least one roller, said gas heating zone being configured such that a steel slab can be rolled through said gas heating zone, wherein said floor is configured such that segments of said floor pivot such that debris can be removed from said gas heating zone, and wherein said roller positioned with respect to said floor such that most of the surface of the roller is not exposed to the interior of the gas heating zone at any time.

21. A method as defined in claim 19 further comprising the step of positioning rollers within said gas heating zones in such a manner that most of the surface of the rollers is not exposed to the interior of the gas heating zones at any time.

22. A method as defined in claim 19 wherein the steel slabs are exposed to gas heating zones and induction heating coils repeatedly until the temperature of the steel slabs reaches approximately 2200° F. or higher.

23. A method as defined in claim 22 wherein said at least one roller of said first gas heating zone and said at least one roller of said second gas heating zone are temperature rated to approximately 2200° F. or less.

24. A method as defined in claim 22 wherein said at least one roller of said first gas heating zone and said at least one roller of said second gas heating zone are temperature rated to approximately 2100° F. or less.

25. A method as defined in claim 22 further comprising the step of providing means for removing debris from said gas heating zones.

26. A method as defined in claim 25 wherein said means of removing debris from said gas heating zones comprises providing means for pivoting downwardly segments of the floor of said gas heating zones.

* * * * *